(12) United States Patent
Brueckner et al.

(10) Patent No.: US 10,662,692 B2
(45) Date of Patent: May 26, 2020

(54) DOOR OF A MOTOR VEHICLE

(71) Applicant: Brose Fahrzeugteile GmbH & Co. Kommanditgesellschaft, Bamberg, Bamberg (DE)

(72) Inventors: Christoph Brueckner, Forchheim (DE); Bernd Herthan, Michelau (DE)

(73) Assignee: Brose Fahrzeugteile GmbH & Co. Kommanditgesellschaft, Bamberg (DE)

( * ) Notice: Subject to any disclaimer, the term of this patent is extended or adjusted under 35 U.S.C. 154(b) by 0 days.

(21) Appl. No.: 16/269,088

(22) Filed: Feb. 6, 2019

(65) Prior Publication Data
US 2019/0242170 A1 Aug. 8, 2019

(30) Foreign Application Priority Data
Feb. 6, 2018 (DE) .................. 10 2018 201 832

(51) Int. Cl.
*E05F 15/40* (2015.01)
*B60J 5/10* (2006.01)
*E05F 15/60* (2015.01)
*E05F 15/73* (2015.01)

(52) U.S. Cl.
CPC ............... *E05F 15/40* (2015.01); *B60J 5/10* (2013.01); *B60J 5/107* (2013.01); *E05F 15/60* (2015.01); *E05F 15/73* (2015.01); *E05F 2015/763* (2015.01); *E05Y 2400/54* (2013.01); *E05Y 2900/546* (2013.01)

(58) Field of Classification Search
CPC .................. E05F 2015/432; E05F 2015/763
See application file for complete search history.

(56) References Cited

U.S. PATENT DOCUMENTS

| | | | | | |
|---|---|---|---|---|---|
| 4,754,440 | A | * | 6/1988 | Naruse | B06B 1/0666 181/148 |
| 8,320,218 | B2 | * | 11/2012 | Massa | G01F 1/662 367/140 |
| 8,411,532 | B2 | * | 4/2013 | Tsuzuki | G01S 7/521 367/140 |
| 8,894,128 | B2 | * | 11/2014 | Barral | B60J 5/107 296/146.6 |
| 9,518,417 | B2 | * | 12/2016 | Serban | E05F 15/73 |
| 9,605,471 | B2 | * | 3/2017 | Salter | E05F 15/73 |
| 9,845,632 | B2 | | 12/2017 | Dezorzi et al. | |
| 9,982,474 | B2 | | 5/2018 | Dezorzi et al. | |
| 10,107,026 | B2 | | 10/2018 | Dezorzi et al. | |
| 2002/0084675 | A1 | * | 7/2002 | Buchanan, Jr. | B60J 5/101 296/146.8 |
| 2009/0000196 | A1 | * | 1/2009 | Kollar | E05F 15/43 49/28 |

(Continued)

FOREIGN PATENT DOCUMENTS

| DE | 102007027575SA1 | 12/2008 |
|---|---|---|
| DE | 102006019710 A1 | 7/2009 |
| DE | 112014002441 T5 | 5/2018 |

*Primary Examiner* — Catherine A Kelly
(74) *Attorney, Agent, or Firm* — Muncy, Geissler, Olds & Lowe, P.C.

(57) ABSTRACT

A door of a motor vehicle, in particular a tailgate, having a section made of a plastic, and having a metallic strut embedded in the section, and having an ultrasonic transducer. The ultrasonic transducer is acoustically coupled to the strut. An electromotor door drive of a motor vehicle is also provided as well as a metallic strut of a door of a motor vehicle.

16 Claims, 2 Drawing Sheets

(56) References Cited

U.S. PATENT DOCUMENTS

| | | |
|---|---|---|
| 2009/0171537 A1 | 7/2009 | Kraus et al. |
| 2016/0083995 A1 | 3/2016 | Dezorzi et al. |
| 2018/0297519 A1* | 10/2018 | Singh .................... B60Q 9/005 |
| 2018/0371812 A1* | 12/2018 | Gregory ................. E05F 15/40 |
| 2019/0170872 A1* | 6/2019 | Hirano ................... E05F 15/40 |

* cited by examiner

DOOR OF A MOTOR VEHICLE

This nonprovisional application claims priority under 35 U.S.C. § 119(a) to German Patent Application No. 10 2018 201 832.4, which was filed in Germany on Feb. 6, 2018, and which is herein incorporated by reference.

BACKGROUND OF THE INVENTION

Field of the Invention

The present invention relates to a door of a motor vehicle and to an electromotor door drive of a motor vehicle, with a door, as well as to the use of a metallic strut of a motor vehicle door. The door is, for example, a tailgate.

Description of the Background Art

Motor vehicles increasingly have electromotor door drives. These comprise a door that is driven by an electric motor. The activation of the electric motor and consequently the movement of the door usually occur as a function of an actuation of a switch by a user of the motor vehicle. The switch is located, for example, in an interior of the motor vehicle or on a key fob. In this case, it is possible that the user does not have a complete clear view the movement range of the door and that there is an obstacle within the movement range. Especially with tailgates, it is possible that there is a non-visible person or a non-visible object behind the motor vehicle. It is also possible with a pivoting of the tailgate that it is brought against a relatively low ceiling. If this happens, the object that is within the movement range will be damaged or it may result in injury to a person who is in the movement range. Furthermore, damage to the door itself is possible, in particular at least to a coating of the door.

Therefore, it is customary for the operating data of the electric motor to be monitored when the electric motor is driven, in particular in the opening direction of the door. Thus, a torque applied by means of the electric motor is usually detected and compared with a threshold value. The torque is usually determined based on an electric current used for energizing the electric motor. If the torque rises above the threshold value, bringing of the door against an object within the movement range is identified. If the threshold value is set as relatively large, however, damage to the object or at least to the door is already possible. However, if the threshold is set too low, full opening of the door will not be possible if door guiding devices become dirty or friction is otherwise increased, especially due to weather conditions.

SUMMARY OF THE INVENTION

It is therefore an object of the present invention to provide a particularly suitable door of a motor vehicle and a particularly suitable electromotor door drive of a motor vehicle, as well as a particularly suitable use of a metal strut of a motor vehicle door, wherein safety is advantageously increased.

The door can be part of a motor vehicle and has, for example, a bearing, in particular a hinge and/or a guide rail, for mounting on the motor vehicle body. Alternatively, the door is suitable, in particular provided and designed, to be mounted on a hinge and/or guide rails. The door itself is in particular part of a motor vehicle body and at least partially forms an outer skin of the motor vehicle. For example, the door is a side door of the motor vehicle, which is pivoted in operation with respect to other parts of the motor vehicle. For example, the door is a driver door or passenger door. In a further alternative, the door is a side door that is moved. To open the door, therefore, in particular to release an opening of the motor vehicle body, it is at least partially moved in the translational direction. For example, in this case, the motor vehicle is a van. For example, the door is an engine hood by means of which an opening in the front region of the motor vehicle is covered. For example, an internal combustion engine or other elements, used in the operation of the motor vehicle, such as an electric motor, batteries, a spare tire, or the like, are disposed in the opening in the normal state. However, the door is particularly preferably a tailgate by means of which an opening located in a rear region of the motor vehicle is covered or at least coverable. The motor vehicle is, for example, a sedan or a station wagon. In particular, when the tailgate is opened, it is pivoted about a horizontal axis. For example, the opening is covered only by means of such a door. Alternatively, the motor vehicle has two such doors, which for opening are pivoted, for example, synchronously or independently of one another, wherein the pivoting directions are preferably opposite directions.

The door can have a section made of a plastic. The plastic is, for example, polypropylene, a polyamide, a polycarbonate, or a polycarbonate blend (PC-ABS). The plastic is in particular a thermoplastic. Alternatively, the plastic is a thermoset. The plastic is expediently fiber-reinforced, in particular by means of glass fibers or aramid fibers. Alternatively, carbon fibers are used as fibers. In other words, the section is made of a fiber-reinforced plastic, and in particular a GRP. Preferably, the section is made in a plastic injection molding process.

A metallic strut is embedded in the section. The strut is made of a metal, for example, an aluminum, therefore, pure aluminum or an aluminum alloy, or a steel, preferably a stainless steel. The section is in particular reinforced and thus stabilized by means of the strut. The strut has, for example, a round or angular, in particular a flat, cross section. The strut is suitably completely surrounded by the plastic of the section, at least circumferentially. For example, the strut has a main extension direction and is preferably straight. Alternatively, the strut is adapted to the specific contours of the motor vehicle and, for example, is bent. In particular, the strut has a kink, preferably in a region of an edge of the tailgate. Preferably, the door has a plurality of such struts, so that the section is relatively stable. For example, the door has only the section or the door has further areas, which are made, for example, of a metal. In this case, the section preferably forms a specific functional unit of the door, in particular a bumper. Suitably, the section at least partially forms an outer skin of the motor vehicle and is expediently provided with a coating in the assembled state. For example, the section itself is colored. In other words, the plastic has its own color, which corresponds in particular to the color of the motor vehicle.

Furthermore, the door can have an ultrasonic transducer. Ultrasonic waves are preferably emitted by the ultrasonic transducer, therefore, in particular longitudinal waves having a wavelength that is not perceptible by the human ear. In particular, the frequency is greater than 16 kHz and preferably less than 200 kHz. The ultrasonic transducer is in particular a loudspeaker and/or has a membrane for emitting such sound emissions. The ultrasonic transducer is acoustically coupled to the strut. In operation, the strut is thus excited by means of the ultrasonic transducer due to the acoustic coupling, so that it also vibrates, suitably at the excitation frequency. In particular, the excitation frequency, therefore, the frequency by means of which the ultrasonic transducer is operated, is the resonant frequency of the strut or at least a frequency by means of which the struts vibrate relatively effectively. As a result, ultrasonic waves are emitted by the strut, wherein the strut has a relatively large area.

During operation, the strut can be excited by the ultrasonic transducer, so that a relatively large area of the section vibrates at the excitation frequency and consequently emits ultrasonic waves. As a result, a relatively large spatial region outside the door, in particular outside the motor vehicle, is penetrated by the ultrasonic waves. If an object is located in this spatial region, the ultrasonic waves are scattered and/or reflected on it. By detecting the scattered/reflected ultrasonic waves, it is thus possible to determine whether an object is located in the region of the door. The ultrasonic transducer is preferably a component of collision protection and/or pinch protection. Here, when the door is opened, preferably a spatial region before/in front of the door is penetrated by the ultrasonic waves and monitored as a result.

For example, the ultrasonic transducer registers whether the strut vibrates at a specific frequency in the ultrasonic range. In this case, the strut is used in particular as a receiver, and the mechanical vibrations are converted by the ultrasonic transducer into electrical signals, which are evaluated, for example. In particular, the ultrasonic transducer is first operated as a transmitter and hence energized. After a certain period of time, the energization is interrupted, and suitably acoustic sound waves in the ultrasonic range are detected by the strut and converted into electrical signals. As a result, relatively few components are required, which reduces manufacturing costs.

The spatial region in the vicinity of the door is monitored based on the ultrasonic transducer, this essentially being done directly. Thus, it is possible to detect an object in this spatial region, before the door strikes it during a movement. As a result, safety is increased.

The door, suitably the section, can have a plurality of such struts, wherein in each case an ultrasonic transducer is expediently coupled acoustically to each strut. In this case, for example, one or more ultrasonic transducers are designed for emitting ultrasonic waves, which are radiated by means of the respectively associated struts into a spatial region adjacent to the door. In particular scattered and/or reflected ultrasonic waves, which arise in particular from this spatial region, are detected by the remaining struts and excited to vibrate. These vibrations are detected by the respective associated ultrasonic transducer.

For example, the strut is substantially rectilinear. Particularly preferably, however, the strut is bent or terminated, resulting in a relatively stable section. Here as well, in particular, radiation or reception of ultrasonic waves takes place in different directions, so that a relatively large spatial region can be monitored by the ultrasonic transducer. For example, the door has an evaluation unit and/or control unit for the ultrasonic transducer, which is coupled to it by means of signals and/or electrically. The evaluation unit in particular evaluates any detected signals. During operation, preferably energization of the ultrasonic transducer occurs with the control unit or at least setting of the operating mode of the ultrasonic transducer. Alternatively, the door has at least one connection for such a unit. In particular, the ultrasonic transducer is coupled electrically and/or by signals to a line having such a connection. Due to the holder, in particular due to the encapsulation of the ultrasonic transducer with the section, it is held relatively securely on the section, so that even with a repeated operation of the door, detachment of the ultrasonic transducer from the section is substantially ruled out.

For example, the ultrasonic transducer is spaced from the strut, wherein the distance is expediently matched to the sound waves emitted or detected by the ultrasonic transducer. Particularly preferably, however, the ultrasonic transducer mechanically directly abuts the strut. As a result, a relatively efficient excitation of the strut is possible. Assembly is also simplified. Expediently, for manufacturing, the ultrasonic transducer is first attached to the strut and surrounded, preferably encapsulated, with the plastic of the section for the production thereof.

The door can have a microphone. For example, the microphone is embedded in the section and, for example, is acoustically coupled to the strut or a further strut. Alternatively, the microphone is glued or mounted onto the section and is thus located on a surface of the section. Relatively efficient detection of scattered/reflected sound waves is enabled as a result. Particularly preferably, however, the microphone is arranged in a pocket within the section. As a result, the microphone is protected relatively efficiently from damage and the effects of weather. Suitably, at least one part of the microphone, for example, any line connected thereto, is molded into the part such that the microphone is securely attached to the section.

The pocket is completely closed, for example, which effectively prevents damage to the microphone. Particularly preferably, however, the pocket has an opening. In this case, the penetration of reflected/scattered sound waves into the pocket is preferably made possible via the opening. The opening is suitable, in particular provided and designed, for this purpose. Particularly preferably, the opening is oriented in the direction of the spatial region, which during operation is penetrated by the ultrasonic waves emitted by the ultrasonic transducer and/or the strut. As a result, the registration of the scattered/reflected ultrasonic waves is relatively efficient. The opening preferably extends to a surface of the section, which facilitates penetration of the sound waves into the pocket. In particular, the opening is the only area of the pocket that is not closed. As a result, penetration of foreign particles into the pocket is possible only via the opening. Particularly preferably, the opening is smaller than the microphone. As a result, detachment of the microphone from the pocket during operation is prevented. It is also possible to design the opening to be relatively small, which makes the penetration of foreign particles, and in particular moisture, into the pocket difficult.

The microphone is, for example, also an ultrasonic transducer and/or structurally identical to the ultrasonic transducer, which is acoustically coupled to the strut. However, the microphone is particularly preferably a MEMS microphone, therefore, a microsystem. In particular, the MEMS microphone is a condenser microphone using microsystem technology in which an electrical micromembrane, which changes the electrical capacitance as a function of the sound waves, is etched directly onto a wafer, in particular a silicon wafer. In particular, in this case a readout electronics with a preamplifier is arranged adjacent to the same wafer. As a result, installation space is reduced and damage to the microphone is prevented relatively efficiently.

For example, the strut is substantially only a flat metal piece, which is used in particular in the manner of an antenna. However, particularly preferably, the strut has a damping element, which is expediently integral with other components of the strut. By means of the damping element, for example, radiation of ultrasonic waves in undesired directions, in particular in the direction of the microphone, if this is present, or in the direction of further struts, if they are present, is prevented. Preferably, the radiation characteristic of the strut is set by means of the damping element, so that the spatial region, which in particular is in front of the movement of the door, is monitored relatively efficiently. Radiation into other spatial regions is expediently prevented or reduced by the damping element. Alternatively or in combination therewith, a radiation frequency of the strut is set by the damping element, so that it emits only ultrasonic waves in a certain frequency range. The frequency range is adapted in particular to the effect that exiting of the ultrasonic waves from the section can take place relatively undisturbed, and/or that a relatively large proportion of the ultrasonic waves is scattered/reflected on the possible object, therefore, for example, a person or a concrete ceiling.

The damping element can be a hole, in particular a bore. In other words, the strut has a bore which is, for example, perpendicular to the main extension direction of the strut. This is relatively easy to realize. A wavelength of the sound waves, which are emitted by the strut, is set based on the bore. In particular, a natural frequency of the strut is set, wherein, for example, standing waves can form between the bore and one end of the strut. In particular, the strut has a plurality of such bores. Alternatively or in combination herewith, the strut has a bending edge as a damping element, which is, for example, parallel to the entire length of the strut or perpendicular thereto. The strut is stabilized in a certain area and/or over a certain length by means of the bending edge, so that the resonant frequency and damping of the strut can be set relatively efficient. The strut's stability is also increased in this way.

The electromotor door drive is a component of a motor vehicle and has a door with a section which is made of a plastic. Further, the door comprises a metallic strut that is embedded in the section. Also, the door has an ultrasonic transducer which is acoustically coupled to the strut. In addition, the electromotor door drive has a drive, which comprises an electric motor. The electric motor is coupled to the door, for example, by means of a gear, which is in particular a worm gear system. As a result, there is a self-locking effect. Alternatively or particularly preferably in combination therewith, the electric motor is coupled to the door by means of a spindle. As a result, movement of the door by means of the electric motor, in particular pivoting, is possible relatively efficiently, wherein manufacturing costs are relatively low.

The electric motor is, for example, a brushed commutator motor. Preferably, however, the electric motor is a brushless electric motor, such as a brushless DC motor (BLDC). The electric motor is particularly preferably a synchronous motor and/or is energized by means of electronics, in particular converter electronics, during operation. In the assembled state, for example, the electronics are coupled by signals, for example, by means of a bus system, to an on-board computer of the motor vehicle or at least one transmitting/receiving device. The electromotor door drive is provided and designed for this purpose. A user input, as a function of which the drive and consequently the electric motor are actuated, is suitably detected by means of the on-board computer or the transmitting/receiving device.

The electromotor door drive further has a collision protection, which is coupled by signals to the ultrasonic transducer. In this case, the ultrasonic transducer in particular detects whether an object is located within a movement range, therefore, a range into which the door is moved by the electric motor during its operation. For example, a transmission and/or receiving of ultrasonic waves occur by means of the ultrasonic transducer. The ultrasonic waves received by means of the ultrasonic transducer or any microphone are evaluated by the collision protection. As a result, monitoring for a collision occurs by means of the ultrasonic transducer.

The collision protection is further coupled to the drive by signals. If it is detected by the collision protection that there is an object in the movement range, a shutdown of the drive or reversal of the direction of the drive occurs, so that the door is moved away from the object. At least, for example, a reduction in the door's movement speed occurs, therefore, preferably a reduction in the electric motor speed. The collision protection is, for example, a pinch protection, so that by means of it pinching of an object by the door is particularly prevented.

The metallic strut is embedded in a section made of a plastic and is part of a motor vehicle door. The strut is made of a metal, for example, an aluminum or a stainless steel, and consequently is a metallic strut. The strut serves in particular to reinforce the section and is thus a reinforcing strut. The strut is used as an acoustic resonator for an ultrasonic transducer. The ultrasonic transducer preferably serves to avoid a collision, suitably when the door is moved. For this purpose, the strut is acted upon in particular by the ultrasonic transducer with acoustic signals, which are radiated due to the resonator effect of the strut by it in a spatial region of the door. Alternatively, the strut is used as a resonator for receiving ultrasonic waves, which are coupled in particular in the ultrasonic transducer, so that the strut acts as a resonator for the ultrasonic transducer. Alternatively or in combination, the ultrasonic transducer is used to avoid pinching when the door moves, so that no object is pinched by the door, in particular between the door and an edge of the motor vehicle body. In particular, when an object is detected by the ultrasonic transducer, movement of the door is terminated or prevented.

The advantages and refinements mentioned in connection with the door are analogously also to be applied to the electromotor door drive/the use and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
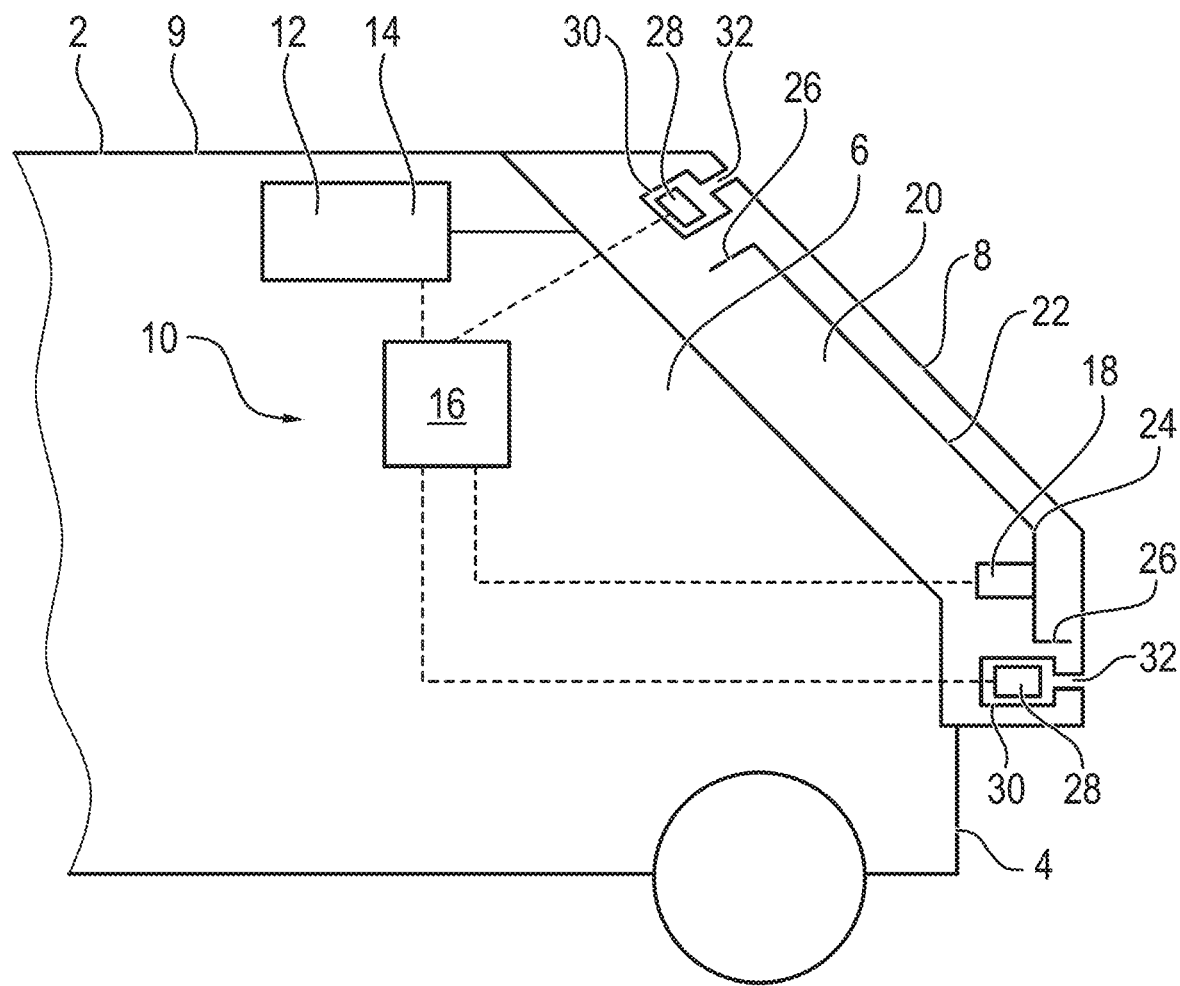
FIG. 1 schematically shows a motor vehicle with a door having an electromotor door drive.

A motor vehicle 2 with a rear section 4, which has a trunk 6, is shown in a partial view in FIG. 1. An opening of trunk 6 is covered with a door 8 in the form of a tailgate, which is pivotally connected to a body 9 with a bearing, not shown in greater detail. Door 8 is a component of an electromotor door drive 10, which further comprises a drive 12 with an electric motor 14, not shown in greater detail, in the form of a brushless DC motor (BLDC). Electric motor 14 is coupled to door 8 by means of a gear, not shown in greater detail, and a spindle, so that the position of door 8 with respect to body 9 can be adjusted by means of electric motor 14. For this purpose, electric motor 14 is suitably energized by means of further components of drive 12.

Furthermore, electromotor door drive 10 has a collision protection 16, which is coupled by signals to drive 12. Collision protection 16 monitors whether an object is located in the pivoting region of door 8. If this is the case, and if pivoting of door 8 by a user or due to other conditions is required, drive 12 is stopped by collision protection 16, so that door 8 is not brought against the object. In this case, in particular, a spatial region lying outside of motor vehicle 2 and located behind motor vehicle 2 is monitored for such an object. Furthermore, collision protection 16 acts as pinching protection, so that no object is pinched between door 8 and a frame, which is fixedly located at rear section 4 of motor vehicle 2, during a closing movement of the door. If an object is detected in this area, drive 12 is also stopped or reversed so that the object is released.

Collision protection 16 is coupled by signals to an ultrasonic transducer 18 which is embedded in a section 20 of door 8. Section 20 is injection molded from a plastic, especially a polycarbonate, and ultrasonic transducer 18 is encapsulated with the plastic during manufacture. Thus, ultrasonic transducer 18 is held securely within section 20. Ultrasonic transducer 18 mechanically directly abuts a strut 22, which runs in the vertical direction along the entire section 20 and is made of a metal, namely an aluminum. Strut 22 in this case has a bend 24, by means of which a completely vertical section is separated from a section of strut 22 extending obliquely thereto. At the two ends in the vertical direction, struts 22 each have a bending edge, which acts as a damping element 26. Strut 22 also comprises bores, not shown in greater detail, which also act as damping elements 26.

Section 20 is stabilized by struts 22 and forms both the upper and lower end of door 8 in the vertical direction. Also, a major part of the surface of door 8 is formed by section 20 which is stabilized by strut 22. For this purpose, door 8 has further struts 22 of this kind, and an associated ultrasonic transducer 18 mechanically directly abuts each of these. Thus, the surface of door 8 is formed substantially only by section 20 and struts 22, so that a relatively light door 8 is provided. It is relatively stable due to struts 22, however. Door 8 also has further struts, not shown in greater detail, by means of which individual struts 22 are coupled, or which otherwise stabilize section 20.

Door 8 also has two microphones 28, which are structurally identical to one another. Microphones 28 are MEMS microphones and thus condenser microphones using microsystem technology. Each microphone 28 is disposed within a respectively associated pocket 30, which is completely closed except for an opening 32. Opening 32 is smaller than microphone 28, so that removal of microphones 28 from the respectively associated opening 30 is not possible. Microphones 28 are encapsulated during production by the plastic forming section 20. Openings 32 are directed outwardly and run perpendicular to the surface of section 20 and substantially perpendicular to the particular nearby part of strut 22. Microphones 28 are also connected by signals to collision protection 16.

When there is a request for actuating electromotor door drive 10 in the opening direction, ultrasonic transducer 18 is excited by collision protection 16 to emit ultrasonic waves, therefore, longitudinal waves at a frequency above the human hearing threshold. Due to the direct mechanical attachment of ultrasonic transducer 18 to strut 22, the ultrasonic waves couple into the strut, which is thus acoustically coupled to ultrasonic transducer 18. As a result, strut 22 also vibrates at the frequency of the sound waves generated by ultrasonic transducer 18, and strut 22 acts as an acoustic resonator for ultrasonic transducer 18. In this case, ultrasonic waves are also radiated from strut 22 to the outside of motor vehicle 2, namely due to the bores acting as a damping element 26 and due to the bending edges substantially perpendicular to the surface of section 20. Due to bend 24, the ultrasonic waves are emitted both substantially horizontally and also inclined thereto. Furthermore, due to the bending edge, propagation of the sound waves directly from strut 22 to microphones 28 is prevented.

If an object is located in the spatial region, the ultrasonic waves are reflected and scattered on it. These reflected or scattered sound waves are detected by microphones 28 and, for this purpose, corresponding electrical signals are sent to collision protection 16. Based on a transit time analysis and/or a frequency shift, a determination of the distance of the object to door 8 takes place. An attenuation of the amplitude of the sound waves is also taken into account for this purpose. If the object is located in the movement range of door 8, therefore, if when door 8 pivots it would collide with the object, drive 12 is controlled by collision protection 16 such that movement of door 8 is prevented. Otherwise, electric motor 16 is energized and door 8 is consequently pivoted. As a result, the opening to trunk 6 is released.

During a closing movement of door 8, microphones, which are not shown in greater detail and are directed toward the interior of motor vehicle 2, monitor whether sound waves emitted by strut 22 are scattered back by an object which is located between body 9 and door 8. If this is the case, a further pivoting of door 8 on body 9 to close trunk 6 is also prevented and electric motor 14 is controlled such that the opening is released. In other words, door 8 is pivoted in the opening direction. Consequently, collision protection 16 also serves as pinch protection.

Figure 2:
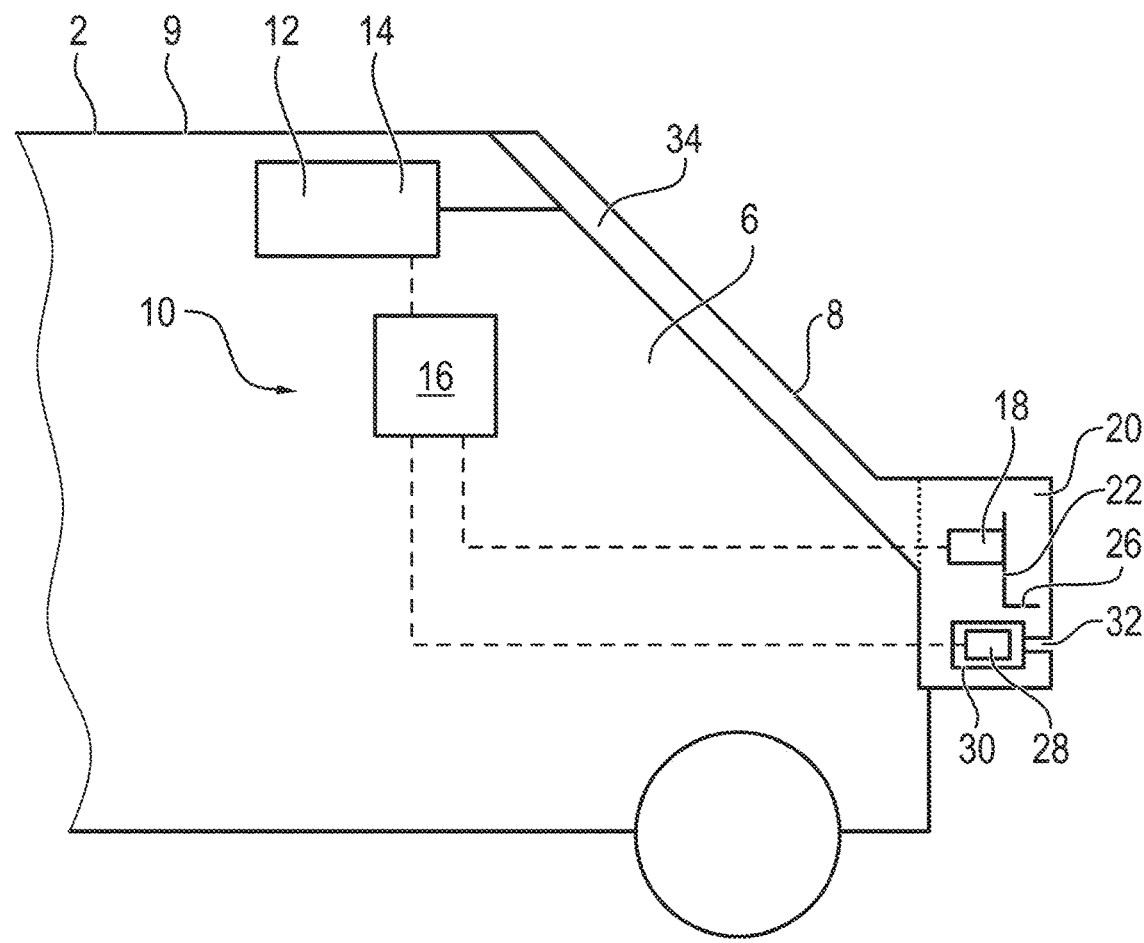
FIG. 2 shows the motor vehicle with a modified door.

FIG. 2 shows an alternative embodiment of electromotor door drive 10, wherein drive 12 remains substantially unchanged. Door 8, on the contrary, is modified and section 20 is reduced in size and essentially forms a bumper. It is connected to a further section 34, in which drive 12 engages and which is pivotally connected to body 9. Also, only a single microphone 28 is shown, wherein opening 32 of associated pockets 30 extends substantially in the horizontal direction. Ultrasonic transducer 18 is not modified but strut 22 is shortened. However, it again has the bending edge, which acts as a damping element 26 and by means of which radiation of ultrasonic waves directly to microphone 28 is prevented.

Figure 3:
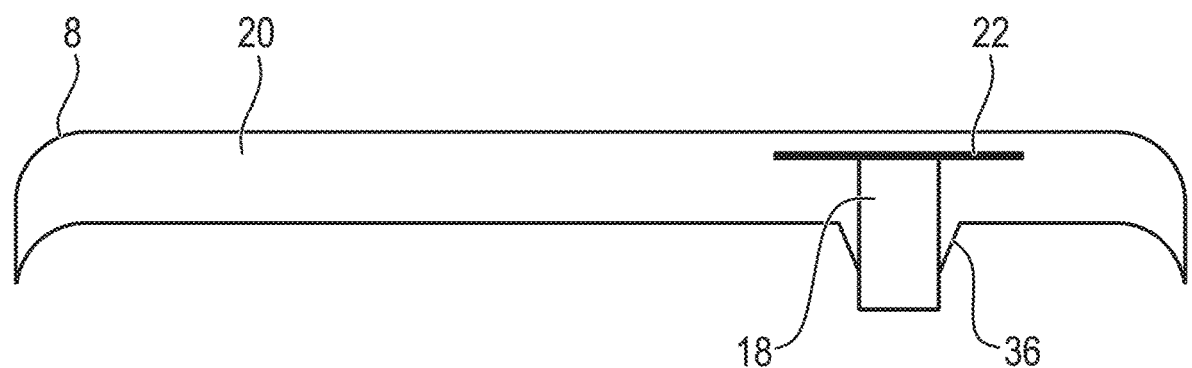
FIG. 3 shows the door in a sectional view.

Door 8 is shown schematically simplified in a horizontal sectional view in FIG. 3. Section 20 is relatively large in area, and strut 22, which is substantially a metal band, is embedded therein. Ultrasonic transducer 18, which is taken up by a holder 36 of section 20, mechanically directly abuts strut 22. Holder 36 has inwardly directed tabs, which are formed on further components of sections 20 and between which ultrasonic transducer 18 is held in a positive manner. Here, in this variant, ultrasonic transducer 18 is mounted after production of section 20 with strut 22 embedded therein, so that a disassembly is possible, for example, in the case of a malfunction of ultrasonic transducer 18.

In summary, door 8 is a plastic tailgate, within which strut 22 is integrated as a metallic strut, and which serves to reinforce door 8. Strut 22 is used to excite and receive ultrasonic waves, wherein strut 22 is used both for reinforcement and as a resonator, in particular for the selective amplification of sound waves generated by ultrasonic transducer 18. In this case, in particular during production, a holder 36 is already molded onto other components of section 20. In an alternative, ultrasonic transducer 18 is inserted into the mold during the production of section 20 and is thus encapsulated during production. Strut 22 is in particular structured in order to realize an attenuation of the ultrasonic waves in the direction perpendicular to the desired sound propagation. In particular, therefore, strut 22 has at least one damping element 26. Damping element 26 is, for example, a bore or a plurality of bores at specific intervals, which thus act as phononic crystals. Alternatively or in combination therewith, damping element 26 is a bending edge, which is introduced into strut 22.

Strut 22 is used, for example, for the additional stabilization of section 20 or is additionally integrated into it. In other words, section 20 has further struts, and a mechanical integrity is provided by means of these struts. As a result, it is possible to make strut 22 relatively delicate as well. Strut 22 is created in particular from sheet metal. The ultrasonic waves, generated by ultrasonic transducer 18, are coupled into strut 22 and in particular conducted.

Preferably, microphones 28 are additionally present, which are, for example, MEMS microphones. The supplying of the ultrasonic waves to these takes place via openings 32 which can be made relatively small and are therefore not very visible. Due to the otherwise closed design of pocket 30, door 8 is designed to be tight, and penetration of moisture or foreign particles into the interior of motor vehicle 2 is prevented. In particular, pocket 30 is sealed off from the interior of motor vehicle 2, for example, with a grommet, which in particular seals off a cable passage to microphone 28. In a further alternative, microphones 28 are integrated directly into the plastic of door 8, therefore, completely surrounded by section 20. Because microphones 28 designed as a MEMS microphone do not have a membrane, it is still possible to detect the ultrasonic waves. For example, microphones 28 are glued or attached to an associated strut 22. Alternatively or in combination therewith, during the production of door 8, microphones 28 are already inserted into the mold used for producing section 20 and consequently encapsulated by the plastic. Microphones 28 are positioned preferably relatively close below the outer skin.

Due to the acoustic coupling of ultrasonic transducer 18 with struts 22, a sound transmission through door 8 and an integration of ultrasonic transducer 18 in door 8 are facilitated. Damping elements 26 in this case have the result that crosstalk between ultrasonic transducer 18 and microphones 28, in particular between the transmitters and receivers, is suppressed. Due to the free selectability of the shape of strut 22, all areas, therefore also areas around door 8, can be monitored. It is also possible to use relatively low-power ultrasonic transducers 18, which consequently have a reduced overall size. To increase the accuracy of determining the location of any object located in the movement area, the number of microphones 28 is preferably increased.

The invention is not limited to the exemplary embodiments described above. Rather, other variants of the invention can also be derived herefrom by the skilled artisan, without going beyond the subject of the invention. Particularly, further all individual features described in relation to the individual exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A door of a motor vehicle, the door comprising:
    a section made of a plastic;
    a metallic strut embedded in the section to stabilize the section; and
    an ultrasonic transducer acoustically coupled to the strut and mechanically directly abutting the strut, such that the strut is excited by the ultrasonic transducer and acts as an acoustic resonator for the ultrasonic transducer.

2. The door according to claim 1, wherein the section has a holder for the ultrasonic transducer.

3. The door according to claim 1, further comprising a microphone disposed in a pocket within the section.

4. The door according to claim 3, wherein the pocket has an opening that is smaller than the microphone.

5. The door according to claim 4, wherein the opening is provided to extend through an exterior outer surface of the door.

6. The door according to claim 3, wherein the microphone is a MEMS microphone.

7. The door according to claim 3, wherein the strut includes a damping element, wherein the pocket is spaced apart from the damping element of the strut, the damping element preventing ultrasonic waves of the ultrasonic transducer from being directly radiated to the microphone.

8. The door according to claim 7, wherein the strut is a flat plate, wherein a distal end of the strut is bent to form a bent distal end, and wherein the bent distal end of the strut is the damping element, such that the bent distal end of the strut is positioned between the pocket and a remainder of the strut.

9. The door according to claim 1, wherein the strut has a damping element.

10. The door according to claim 9, wherein the damping element is a hole or a bending edge.

11. The door according to claim 1, wherein the door is a tailgate of the motor vehicle.

12. The door according to claim 1, wherein the ultrasonic transducer is encapsulated within the plastic of the section.

13. The door according to claim 1, wherein the strut is encapsulated within the plastic of the section.

14. The door according to claim 1, wherein the ultrasonic transducer is mounted on a back surface of the strut, the back surface of the strut facing towards an interior of the motor vehicle.

15. An electromotor door drive of a motor vehicle, the electromotor door drive comprising:
    the door according to claim 1;
    a drive coupled to the door;
    an electric motor; and
    a collision protection that is coupled by signals to the ultrasonic transducer and the drive.

16. A metallic strut that is embedded in a section, which is made of a plastic, of a door of a motor vehicle, the metallic strut being acoustically coupled to an ultrasonic transducer and mechanically directly abutting the ultrasonic transducer, such that the strut is excited by the ultrasonic transducer and acts as an acoustic resonator for the ultrasonic transducer to prevent collision and/or pinching,
   wherein the strut stabilizes the section.

\* \* \* \* \*